US009675943B2

(12) United States Patent
Jialanella et al.

(10) Patent No.: US 9,675,943 B2
(45) Date of Patent: Jun. 13, 2017

(54) TWO PART MOLDED PART USEFUL AS A MIXER FOR VISCOUS CURABLE MATERIALS

(71) Applicant: DOW GLOBAL TECHNOLOGIES LLC, Midland, MI (US)

(72) Inventors: Gary L. Jialanella, Oxford, MI (US); Lirong Zhou, Rochester Hills, MI (US); Andrew R. Kneisel, Clarkston, MI (US); Larry R. Ruddy, Lake Orion, MI (US); Peter J. Schulz, Midland, MI (US); Matthew J. Turpin, Sanford, MI (US); Michael C. Cocca, Macomb, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 71 days.

(21) Appl. No.: 14/765,385

(22) PCT Filed: Mar. 14, 2013

(86) PCT No.: PCT/US2013/031291
§ 371 (c)(1),
(2) Date: Aug. 3, 2015

(87) PCT Pub. No.: WO2014/142869
PCT Pub. Date: Sep. 18, 2014

(65) Prior Publication Data
US 2016/0008774 A1 Jan. 14, 2016

(51) Int. Cl.
*B01F 7/04* (2006.01)
*B01F 5/06* (2006.01)
*B29B 7/04* (2006.01)

(52) U.S. Cl.
CPC ............ *B01F 5/0605* (2013.01); *B01F 5/061* (2013.01); *B01F 5/0612* (2013.01);
(Continued)

(58) Field of Classification Search
CPC .......... B29B 7/325; B01F 5/0605; B01F 7/04; Y10T 428/19
See application file for complete search history.

(56) References Cited

U.S. PATENT DOCUMENTS

| 6,899,453 | B2 | 5/2005 | Koch et al. |
| 2012/0107324 | A1 | 5/2012 | Eberlein et al. |
| 2012/0134232 | A1 | 5/2012 | Schneider |

FOREIGN PATENT DOCUMENTS

| CN | 1356925 | 7/2002 |
| CN | 101421029 | 4/2009 |

(Continued)

OTHER PUBLICATIONS

Office Action and Search Report from the State Intellectual Property Office of the People's Republic of China for Application No. 201380074120X dated Jul. 18, 2016.
(Continued)

*Primary Examiner* — Alexander Thomas
(74) *Attorney, Agent, or Firm* — The Dobrusin Law Firm, P.C.; Norman L. Sims

(57) ABSTRACT

The present invention relates to articles comprising a plurality of molded hollow parts (11) having different central axis (14, 15) through the hollow elements, further having passages in walls of the hollow parts transverse to the central axis of the hollow parts. The present invention also relates to methods applying two part curable materials to substrates using the molded parts of the invention as mixing elements.

18 Claims, 5 Drawing Sheets

(52) U.S. Cl.
CPC .............. *B01F 5/0615* (2013.01); *B29B 7/04* (2013.01); *B01F 2005/0631* (2013.01); *B01F 2215/006* (2013.01); *B01F 2215/0049* (2013.01)

(56) References Cited

FOREIGN PATENT DOCUMENTS

| | | |
|---|---|---|
| EP | 1189686 B1 | 10/2003 |
| EP | 1815904 A1 | 8/2007 |
| EP | 1837070 A1 | 9/2007 |
| EP | 2011562 A1 | 1/2009 |
| EP | 1830070 B1 | 11/2013 |
| FR | 2807336 A1 | 10/2001 |
| FR | 2913897 A1 | 9/2008 |
| WO | 2012/151085 A1 | 11/2012 |
| WO | 2012/151086 A1 | 9/2014 |

OTHER PUBLICATIONS

International Search Report and Written Opinion dated Nov. 22, 2013 for Application No. PCT/US2013/03291.
Gingras J-P, et al, "Inline Bitumen Emulsification Using Static Mixers," Ind. Eng Chem Res, 2007, vol. 46, pp. 2618-2627.

TWO PART MOLDED PART USEFUL AS A MIXER FOR VISCOUS CURABLE MATERIALS

FIELD OF INVENTION

The invention relates to articles comprising a plurality of molded hollow parts having different central axis through the hollow elements further having passages in walls of the hollow parts transverse to the central axis of the hollow parts. The invention also relate to methods of applying two part curable materials to substrates using the molded parts of as mixing elements.

BACKGROUND OF THE INVENTION

Two part curable compositions are used in a variety of applications such as adhesives, coatings, foams and the like, where rapid cure is required for the application, especially where the two parts are not shelf stable when in contact with one another. Shelf stable means that the composition does not cure in storage. Two part curable compositions which exhibit viscosities may be difficult to mix and apply. Examples of such systems are disclosed in WO 2012/151086 and WO 2012/151085, incorporated herein by reference in their entirety. This is especially a problem where the two parts are mixed in a relatively high volumetric ratio of one part to the other. When the two parts are mixed in high volumetric ratio of a one part to the other, the two dissimilar parts may be stored in a bag in bag tube, wherein the smaller volumetric part is stored in a bag disposed in the higher volumetric part, one of the bags is generally disposed along the outer wall forming the tube. The bag forms a barrier to contact of the two parts. This configuration allows for utilizing any volumetric ratio without concern for the size of the material tubes and their ability to work with standard two part mixers. Common concerns include high back pressure of the curable material and thorough mixing of the materials. If the back pressure resulting from introducing highly viscous material into the mixer used is too high, the curable materials will not pass through the mixing chamber and cannot be applied. If the two parts are not adequately mixed the curable material will not cure in a manner desired. A complicating factor is that many two part composition are applied in remote locations or by consumers, where there is limited or no access to applicators capable of applying sufficiently high pressures to overcome the back pressures and thoroughly mix the parts, many common manually driven or battery driven applicators do not have the capability to overcome backpressures resulting from trying to pass a highly viscous material through mixers capable of properly mixing such compositions.

Complex mixing systems have been developed to address these problems, see for example, EP 1,189,686; and EP 1,830,070 and EP 2,011,562 incorporated herein by reference in their entirety. Such systems can be complicated to use or costly to manufacture.

What is needed is mixer systems that can thoroughly mix highly viscous two part compositions using manual and battery operated applicators without creating unacceptable back pressures, which are easy to use and can be manufactured in a cost effective manner. What are needed are methods for applying viscous two part curable systems utilizing such mixing systems.

SUMMARY OF THE INVENTION

The invention relates to articles comprising a plurality of molded hollow parts having different central axis through the hollow elements further having passages in walls of the hollow parts transverse to the central axis of the hollow parts. The invention also relates to methods of applying two part curable materials to substrates using the molded parts as mixing elements.

The invention relates to articles comprising: two parts each part having two or more sections connected together wherein each section is formed from one or more molded materials, which form the periphery of a hollow structure having a proximal end, a distal end, a cross section and open passages in the molded material on the periphery of the hollow structure, a central axis through the hollow structure transverse to the cross section of the molded material and the passages in the molded material having a central axis through the passage; wherein adjacent sections are connected near the proximal end of each section and the angle formed by the central axis of adjacent connected sections is from about 45 to about 90 degrees and the angle formed by the central axis of the hollow structure of each section and the central axis of the passages in the molded material is from about 45 to about 90 degrees; wherein each part is a mirror image of the other and the two parts can be assembled to form an article having a portion which is symmetrical. Preferably, the molded material of each section forms a consistent cross-section formed along planes perpendicular to the central axis of the hollow structure. Preferably, the adjacent elements are connected together near the proximal end at a location from the proximal end that is equal to about half or less of the linear distance of the central axis of two sequential elements of the same orientation while in the assembled state. In some embodiments one part has connected to one end a molded structure comprising one or more asymmetrical portions, such as helical shaped elements. Preferably, the two parts are assembled.

In another embodiment, the invention is a method comprising: a) introducing two parts of curable material having a high viscosity into an elongated mixing chamber having a mixer comprising an article of the invention, an inlet and an outlet, wherein the helical portion is disposed at the inlet end of the chamber so that the two parts of the curable material passes through the helical section first; b) applying sufficient pressure on the material entering the inlet of the chamber to move the material through the chamber in contact with the mixer under conditions that the two parts are mixed sufficiently to cure and perform the desired function of the curable material; and c) applying the mixed two parts of the curable material to one or more substrates. Preferably the method further comprises: d) contacting a first substrate with a second substrate with the mixed two part curable material disposed between the two substrates; and e) allowing the mixed two part curable material to cure and bond the two substrates together.

The articles of the invention can be manufactured in two part molds in a cost effective manner. The articles are effective in mixing two part curable compositions using manual or battery driven application systems.

DETAILED DESCRIPTION

Figure 1:
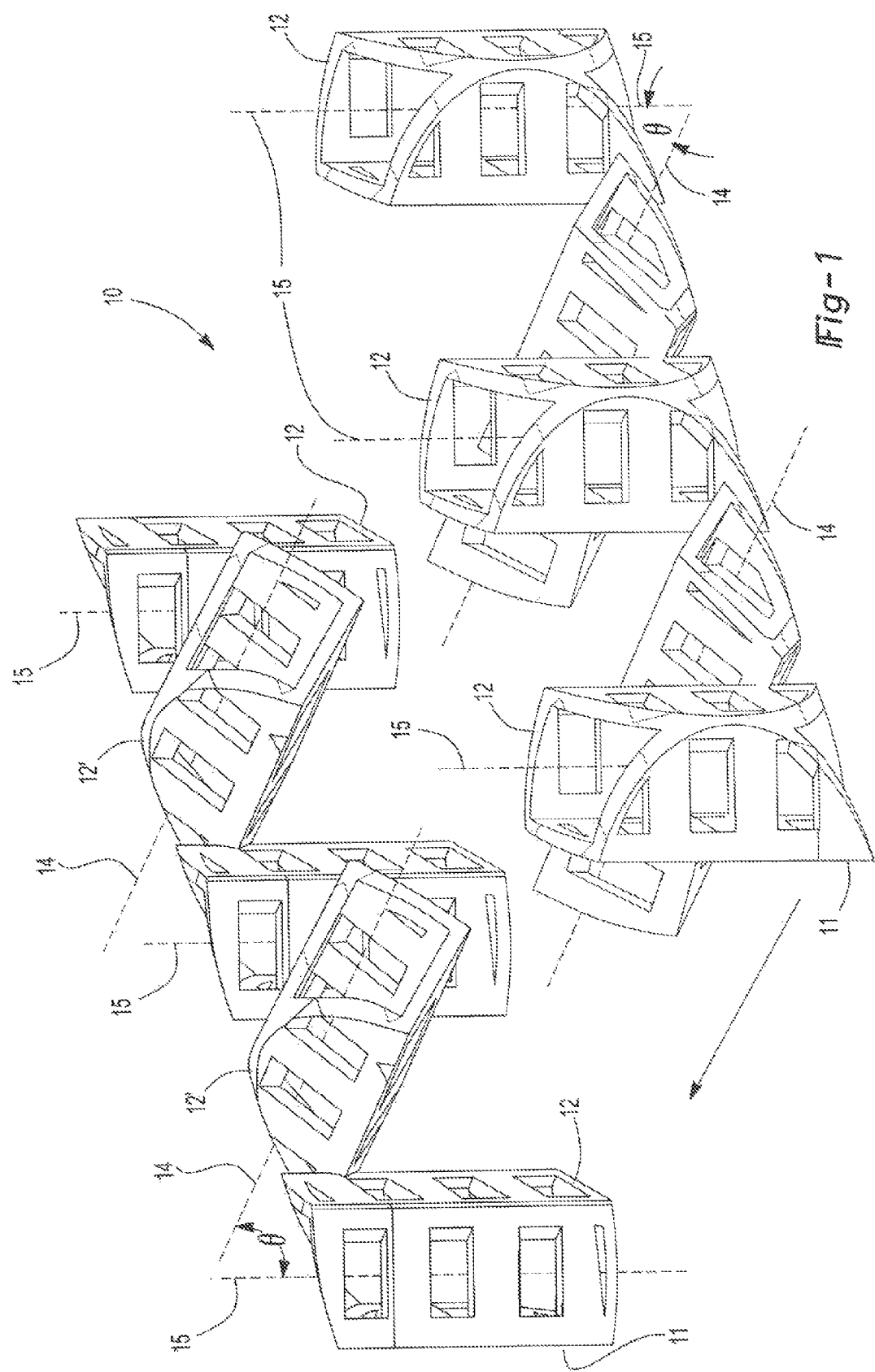
FIG. 1 show two parts of an article of the invention useful as a static mixer.

The explanations and illustrations presented herein are intended to acquaint others skilled in the art with the invention, its principles, and its practical application. Accordingly, the specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference the all purposes. The following claims are hereby incorporated by reference into this written description.

The invention relates to an article that can be prepared in two parts which two parts can be assembled to form an article which is symmetrical or which has a symmetrical portion. The two parts are molded parts and can be molded using two part molds. Where the article is completely symmetrical a single two part mold may be utilized to prepare the two parts. In other words if the two parts are identical and can be mirror images of one another a single mold can be utilized. The two parts are capable of being assembled to form an article which is symmetrical or which has a symmetrical portion, if one or both of the two parts contain a non-symmetrical section two molds are required. Symmetrical as used herein means the parts can fit together to form a part that is virtually identical on each side of a plane running through the center from the proximal to the distal end. In general the article comprises: two parts wherein each part has two or more sections connected together wherein each section is formed from one or more molded materials wherein the molded materials than the periphery of a hollow structure having a proximal end, a distal end, a cross section and open passages in the molded material on the periphery of the hollow structure, a central axis through the hollow structure transverse to the cross section of the molded material and the passages in the molded material having a central axis through the passages; wherein adjacent sections are connected near the proximal end of each section and the angle formed by the central axis of adjacent connected sections is from about 45 to about 90 degrees and the angle formed by the central axis of the hollow structure of each section and the central axis of the passages in the molded material is from about 45 to about 90 degrees; wherein each part or a portion thereof is a mirror image of the other and the two parts mirrored parts can be assembled to form a symmetrical structure.

The parts of the article of the invention are prepared from any material that can be molded in a two part molding system or which can be formed by casting. Exemplary materials include thermoplastics, thermosets, metals and the like. Preferred materials are thermoplastics and thermosets, with thermoplastics preferred. Preferred thermoplastics comprise any plastic with a glass transition temperature or heat deflection temperature above room temperature and include polyolefins, polyamides, polystyrenes, acrylonitrile butadiene styrene (ABS), blends of acrylonitrile butadiene styrene with polycarbonate (PC/ABS) and the like. Preferred thermosets comprise any thermosetting material with a heat deflection temperature above room temperature and include polyurethanes, polyureas, acrylics, polyesters, epoxies and the like The materials may further comprise fillers, reinforcing agents, internal mold release agents, stabilizers, antioxidants, live retardants and the like known to those skilled in the art. Exemplary fillers include talc, fumed silica and the like. Preferred reinforcing fibers include polymer, glass, carbon fibers, ceramics, clays and the like.

Two or more parts are assembled to form an article. Each part comprises a plurality of hollow structures having a proximal end and a distal end. The plurality of hollow structures are affixed to one another near one end of the hollow structure, designated as the proximal end. The distal end is the end furthest from where the hollow structures are affixed to one another. The point where the hollow structures are affixed together is preferably formed during formation of the parts. The hollow structures have a central axis passing through the center of the molded hollow structure from the proximal end to the distal end. The molded material forms walls about the central axis. The walls form at cross-section transverse to the central axis passing through the molded parts. The cross-section is preferably consistent along the central axis of the hollow parts from the proximal end to the distal end. The cross section can be any cross section suitable for the desired end use, for example, irregular, circular, oval, polygonal and the like. Preferably the cross section is, circular, oval or polygonal. More preferably the cross section is polygonal, even more preferably square or rectangular and most preferably square. As is well known to the skilled artisan draft angles may be engineered into the parts so as to facilitate formation of the parts and removal of the parts from molds.

The walls of each hollow structure preferably contain passages therethrough that have their own central axis that are transverse to the central axis of the hollow structures. The passages through the walls are of a size and shape to facilitate the articles of the invention to perform the function the article is designed to perform. The passages through the wall preferably have a consistent shape. Exemplary shapes include irregular, circular, oval, polygonal and the like. Preferably the shapes are circular, oval, polygonal with polygonal being more preferred and square or rectangular most preferred. The passages in the walls of the hollow structure may pass through the opposite wall of the hollow structure or there may be no passage opposite the passage in the wall of the hollow structure. In some embodiments, it is preferred that there is a wall opposite to passages in the wall of the hollow structure.

The plurality of hollow structures of each part are connected near the proximal end of the hollow structures such that the central axis of adjacent parts form an angle. The angle is chosen such that the parts can be manufactured using a two-part mold and the articles formed from the parts can perform the desired function. Preferably the angle of the central axis of the two adjacent hollow structures is about 90 degrees or less. Preferably the angle of the central axis of the two adjacent hollow structures is about 45 degrees or greater, more preferably 60 degrees or greater and most preferably about 85 degrees or greater. Most preferably the angle is about 90 degrees.

Each hollow section is connected to an adjacent section. They can be connected in any manner known in the art, for example by mechanical connection, adhesive, welding, by a molded or cast in connection. A molded, or cast, in connection is formed during molding, or casting, where a portion of the material utilized to prepare the parts is formed between the adjacent sections which holds the adjacent hollow sections together. Preferably the connection utilized maintains the angle between the central axis of adjacent hollow parts. The connection is located near the proximal end of the hollow parts. The distance of the connection from the proximal end is chosen so as to allow the article of the invention to perform its desired function. Preferably, the adjacent elements are connected together near the proximal end at a location from the proximal end that is equal to half the linear distance of the central axis of two sequential elements of the same orientation while in the assembled state. Preferably the connection is disposed with respect to the proximal end within 30 percent of the length of the hollow section, and more preferably about 20 percent of the length.

The two or more parts of the article are adapted to be connected to form an article that is symmetrical or which has a portion that is symmetrical. The parts comprise a plurality of hollow elements. A sufficient number of the hollow elements are utilized to allow the ultimate article to perform the function it is designed to perform. Preferably each part comprises two or more hollow sections and more preferably three or more sections. In some preferred embodiments when the two parts are connected together each hollow part has an adjacent hollow part having a central axis parallel to its central axis. The pair of hollow parts form a symmetrical element when the two or more parts are connected. The number of pairs of adjacent hollow parts, hereinafter referred to as elements, utilized in the article is chosen such that the article can perform the function it is designed to perform. The two or more parts are designed to be connected. They can be connected by any method that facilitates the ultimate use of the articles of the invention. They can be connected by mechanical devices, built in snap fits, interference fit, adhesives, welding and the like. Preferably the parts are connected by built in snap fits or interference fit. In a preferred embodiment the two adjacent sections are square or rectangular and have corners of the square or rectangle adjacent to one another. Such elements from the cross-sectional perspective have two squares or rectangles having adjacent corners, such structure in the central part forms an X. The next adjacent pair of elements have central axis disposed at the angles described hereinbefore.

One or more of the parts may comprise a non-symmetrical part. The non-symmetrical part may be formed by any means capable of preparing the specific shape. The non-symmetrical part may be attached to the symmetrical section using any known attachment method, for instance formed with an integral connection, mechanical methods, welding, an adhesive and the like. Preferably the nonsymmetrical section is molded at the same time as one or more of the parts and the connection is formed during the molding operation.

In the embodiment wherein articles of the invention are useful as mixers for flowable material. Each pair of hollow elements with parallel central axis can be referred to as a mixing element. In a preferred embodiment wherein the two adjacent elements contact one another along a corner, the adjacent elements form an X in the central section from a cross-sectional perspective. In a preferred embodiment the passages in the walls of the hollow section are opposite solid walls along the opposing wall of the hollow section. This feature is utilized to force the material passing through a passage in a first hollow wall of a section to move in another direction when it meets the opposing wall of the hollow section.

In a preferred embodiment mixers prepared according to the invention comprise a nonsymmetrical section. Preferably the nonsymmetrical portion is connected to one of the two or more parts and preferably is formed integrally to the part it is attached to. The non-symmetrical part can have any shape that enhances the function of the article, for instance mixing along with the symmetrical port. Preferably the non-symmetrical part forms a helical path. As used herein element with respect to the non-symmetrical part, helical element, means a single helical section. A helical section comprises a sheet of material that has a bend in it which bends about 180 degrees. Material flowing along the helical section is turned about 180 degrees. Preferably the end of a helical section comprises a straight edge. Preferably the straight edge of one helical section is rotated 90 degrees from the straight edge of the next section. This rotation forces material flowing from one helical section to another to be divided by the straight edge of the next helical section. If a series of helical sections are used the flowing material is divided at the beginning of each helical section.

The parts utilized to form the articles of the invention are prepared by molding. Preferably injection molding. Preferably the mold is a two part mold having actuated slides. The angle between the direction of the actuated slides and the face of each mold is dictated primarily by the angle of the central axis of one hollow element to another within a molded part. In the event that one or more parts comprise a non-symmetrical part a separate mold is utilized for parts of different shapes. In essence, the moldable material is converted into a flowable material. This may be done by heating the material to a temperature at which it is molten. The moldable material is injected into a closed mold as described. The mold may be treated with a mold release prior to injection of the moldable material or the moldable material may contain an internal mold release. After injection the moldable material is cooled or allowed to cool and the mold is opened to release the parts. The particular conditions for molding are material dependent and one skilled in the art would know the appropriate conditions for the specific moldable material. After removal from the mold any flashing is removed. The two or more parts are assembled to form the article.

The articles of the invention can be used for a variety of purposes, for example as mixers, blenders applicators, rheology modifiers, and the like. In a preferred embodiment the articles are used as static mixers for mixing viscous materials. Preferably the mixers are used for multipart systems that are reactive and mixed just prior to use, for example adhesives, coatings, body fillers, foamed plastics or polymers, dispersions and the like. More preferably the articles are used for two part systems. Preferably the articles are used for adhesive systems. Mixing sys-tems that the mixers can be utilized with typically comprise a mixing tube with a nozzle at the end of the mixing tube. The mixing tubes generally contain a passage for introduction of the ma-terial to be mixed into the tubes. Disposed in the tubes can be static mixers adapted to mix the parts of the material introduced into the tubes. Typical mixers contain a system for applying pres-sure to the material introduced into the tubes to drive the material through the mixer. The system for applying pressure generally includes plungers that push the material to be mixed into, through and out of the exit nozzle of the mixing tube. Commonly the parts to be mixed are disposed in two separate tubes of the material to be mixed and separate plungers are used fed each material to push the material from each tube in the mixer. Typically the material in each tube is reactive with the material in the other tube and the components start to cure when mixed. Alternatively the two parts may be located in the same tube with a membrane or film separating the two parts so that they are not in contact in the tube. The smaller volume part is typically located in the inner bag. Often the part in the inner bag is located alone the side of the tube. Thus the mixer needs to dis-perse the smaller part throughout the mixed materials to achieve even cure of the materials. This system is often referred to as a bag-in-bag system and is often utilized when the volumetric ratio of the two parts is high. This type of system allows the use of materials having odd volumetric ratios. The nozzle of the mixing tube may be shaped to extrude a bead of the mixed material of a desired shape. In mixing the pressure applied to the materials being mixed is sufficient to overcome the back pressure of the materials being mixed as it passes through the mixer. This sys-tem is especially useful for manual or battery operated mixing systems as such systems are limit-ed in the amount of pressure that can be applied to the materials. Such systems are typically utilized outside of workshops, for instance by wind shield installers working remotely. Preferably the mixers utilized apply pressure to the materials moved through the mixer of about 100 psi (6.89 kPa) or greater, more preferably about 150 psi or greater and most preferably about 200 psi (1379 kPa) or greater. Preferably the mixers utilized apply pressure to the materials moved through the mixer of about 500 psi (3447 kPa) or less and most preferably about 300 psi (2068 g kPa) or less.

In preferred embodiments mixers of the invention com-prise symmetrical sections and non-symmetrical sections. In one embodiment, the symmetrical sections are referred to as symmetrical X grids. In a preferred embodiment the non-symmetrical sections comprise helical elements. The relative number of symmetrical and non-symmetrical elements are chosen to passage of multiple part systems through the mixer with adequate mixing and without undue back pressure. Adequate mixing means that the parts mix sufficiently to cure evenly throughout the applied mixture. Undue back pressure means that the material cannot be moved through the mixing tubes with the available system for applying pressure to the mixed materials, for example a manual or battery operated mixing system. Preferably the non-symmetrical part of the mixer is disposed at the inlet end of the mixing tube. The inlet end is the end to which the materials to be mixed are introduced. As a corollary the symmetrical section is disposed nearest to the outlet of the mixing tube that is the nozzle through which the mixed material passes before application to a substrate. The mixers of the invention preferably comprise more than one of each type of element. Generally the mixers comprise sufficient number of helical sections (non-symmetrical sections) to reduce the viscosity of the materials to be mixed, for instance by shear thinning the materials. The number of X grids, symmetrical sections, are chosen to achieve adequate mixing. Preferably 3 or more non-symmetrical sections (helical sections) are utilized. Preferably 4 or more non-symmetrical sections (helical sections) are utilized. Preferably 5 or less non-symmetrical sections (helical sections) are utilized. Most preferably 5 non-symmetrical sections (helical sections) are utilized. Preferably 3 or more symmetrical sections (X grid sections) are utilized and more prefer-ably 4 or more symmetrical sections (X grid sections) are utilized. Preferably 6 or less symmetrical sections (X grid sections) are utilized and more preferably 5 or less symmetrical sections (X grid sections) are utilized. Most preferably 5 symmetrical sections (X grid sections) are utilized. The length of each symmetrical (X grid) section and each non-symmetrical section is chosen to achieve the objectives of the formed parts. A skilled artisan would adapt the specific lengths for the particular application.

The mixers of the invention are adapted to fit in the mixing chambers in which they are used. Preferably the mixer fills the mixing chamber to prevent materials to be mixed from passing around the mixer and thus not mixing. Preferably the mixer has the same cross-sectional shape as the mixing chamber for this reason. Preferably the cross section is circular or oval. The articles are preferably designed and manufactured such that when the parts are assembled they have the proper cross-sectional shape. The symmetrical section parts are adapted to have outside shapes for this purpose, the portion of the symmetrical section that will be on the outside of the part is contains design features to form the appropriate cross-sectional shape.

In some embodiments the symmetrical, nonsymmetrical or both sections contain reinforcing structures. Such reinforcing structures can be any shape or in any location such that the mixer has sufficient structural strength to withstand the pressures utilized during mixing. The reinforcing structures can be rails or ribs. Preferably the ribs or rails are disposed in the direction of mixing. Preferably a plurality of such structures are utilized. The helical section preferably contains ribs or rails to support this section. Preferably 2 to 4 rails are disposed substantially equally about the helical sections.

The mixers of the invention are useful in mixing any multipart compositions, preferably two part compositions. Such mixers are useful in mixing highly viscous multipart systems. In preferred embodiments the mixers of the invention are useful in mixing systems having a viscosity of about 30,000 centipoises or greater and more preferably about 100,000 centipoises or greater. Preferably the mixers of the invention are useful in mixing systems having a viscosity of about 5,000,000 centipoises or less. The mixers can be used to mix any curable systems, for example adhesive systems. The mixers can be utilized to mix two part hybrid systems containing isocyanate functional prepolymers and acrylate containing monomers, oligomers or polymers, such systems are disclosed in WO 2012/151086 and WO 2012/151085, incorporated herein by reference.

The separate parts are placed into the mixing system and passed into and through the mixing tube to mix the parts. As the mixed parts are passed through the nozzle at the outlet such mixed parts are applied to a substrate. Where the mixed parts are useful as an adhesive two substrates are contacted with the mixed parts disposed between them and the mixed parts are allowed to cure and bond the substrates together.

Figure 2:
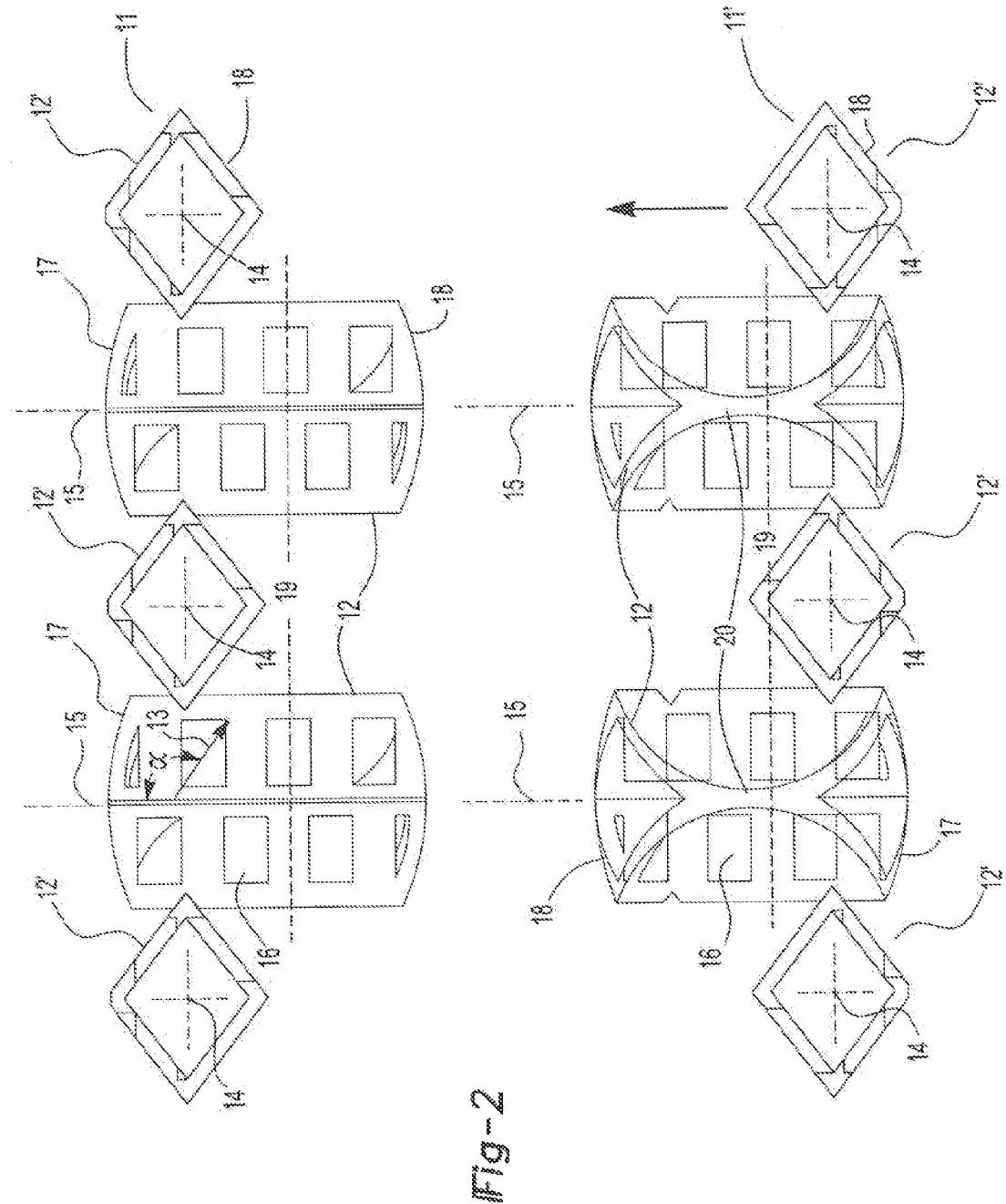
FIG. 2 shows the two parts of the article of FIG. 1 from another angle.

FIG. 1 shows two parts of an article of the invention 10 useful as a mixer known in the art as an SMX mixer. Illustrated are two symmetrical parts 11 and 11' each having sections 12 and 12' with different central axis 14 and 15 through the molded material forming each section, the angle between the central axis of adjacent sections being theta. The arrows show how the two parts are placed together. FIG. 2 shows the two parts from a different angle. Shown are parts 11 and 11', sections 12 and 12' and central axis 14 and 15. Also shown are a plurality of passages 16 in the molded material wherein the passages each have central axis 13, disposed through the center of the passages 16. Each section has a proximal end 17 and a distal end 18. Dotted line 19 illustrates the direction of the plane of the cross section of the sections. Many mixers are adapted to the shape of the mixing chamber into which they are placed. Common mixers have round or oval cross-sectional shapes and elongated chambers. The mixing elements are often adapted in cross-section to the shape of the mixing chamber. The taper of the corners of the SMX elements is illustrated, 20. The arrows show how the two parts are placed together. FIG. 2 also shows the angle between the central axis 15 of a section and the central axis of a window 13, $\alpha$.

Figure 3:
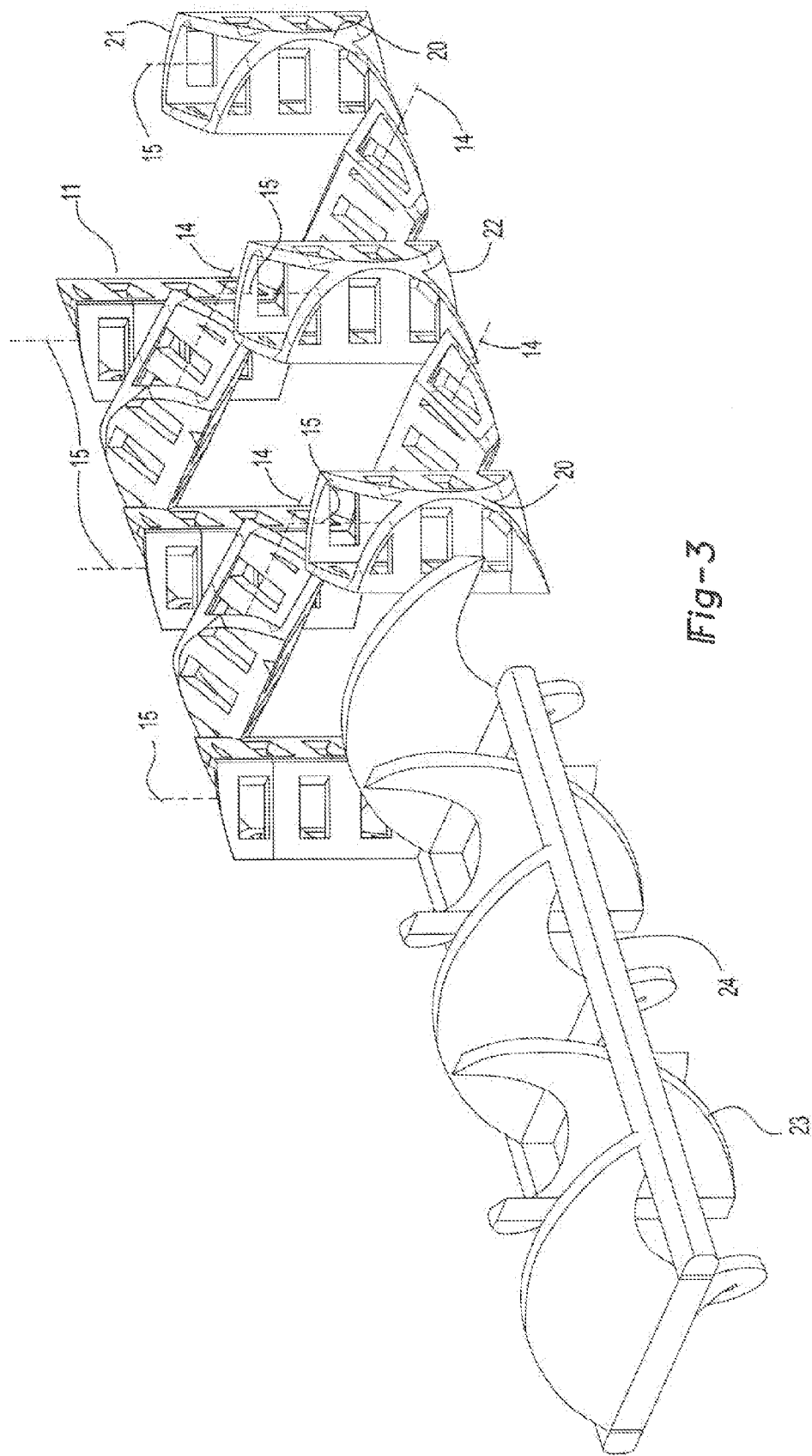
FIG. 3 shows an article in two parts one having a helical section.
Figure 4:
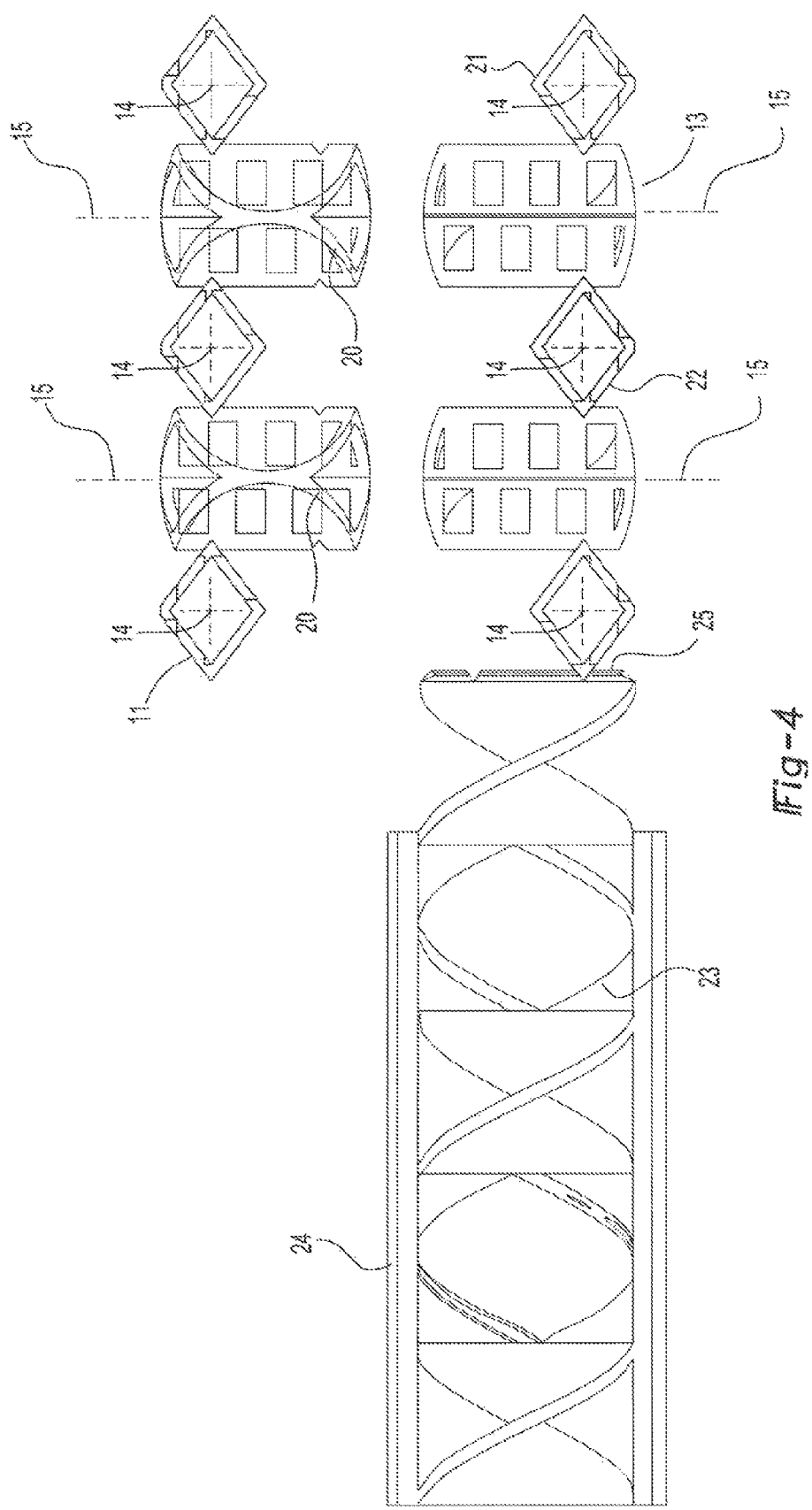
FIG. 4 is an applicator of FIG. 3 from another angle.
Figure 5:
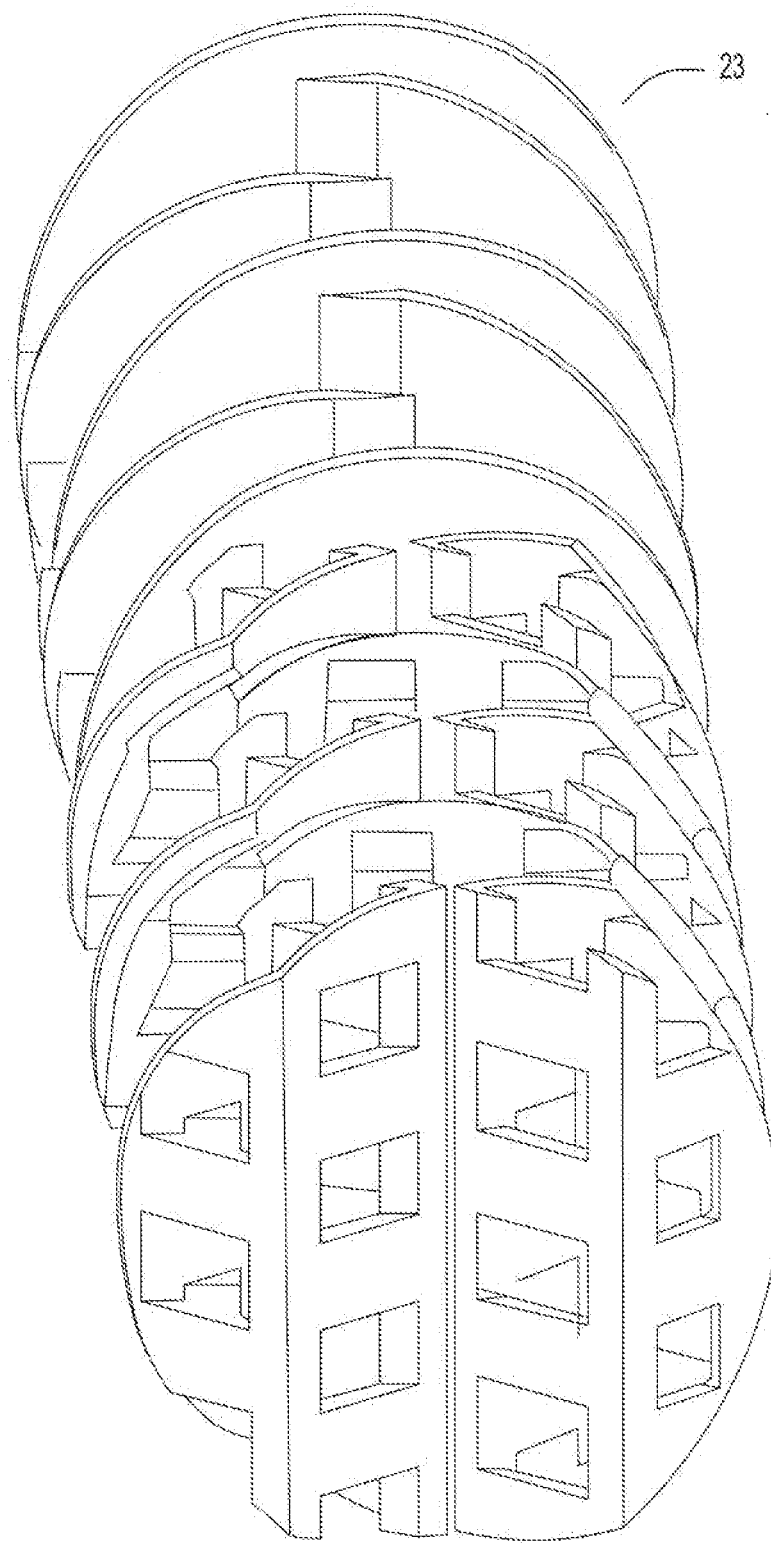
FIG. 5 shows the article of FIGS. 3 and 4 assembled and from its end.

FIG. 3 shows a part 11 which is forms a symmetrical article and a part 21 which forms a symmetrical article further having a non-symmetrical section. Part 21 contains a symmetrical forming portion 22 and a non-symmetrical section 23. FIG. 3 also shows a support rib or rail 24 on the non-symmetrical portion. The two parts are shown in an exploded format. FIG. 4 shows the article of FIG. 3 from a different angle. FIG. 5 shows an article shown in FIGS. 3 and 4 from an end section wherein the two parts are connected and to show the circular cross-sectional shape of the article adapted for use in a mixing chamber having a circular shape.

One or more as used herein means that at least one, or more than one, of the recited components may be used as disclosed. Preferably the cure rate is determined by determining the dynamic yield stress, measured by G' on a rheometer. Preferably the G' is $6 \times 10^6$ Pa the strength of the curing adhesive at a designated time.

ILLUSTRATIVE EMBODIMENTS OF THE INVENTION

The following examples are provided to illustrate the invention, but are not intended to limit the scope thereof. All parts and percentages are by weight unless otherwise indicated.

Mixing Examples A two part adhesive prepared as described in WO 2012/151086 and WO 2012/151085 with the viscosity adjusted by adding additional plasticizer to the recited press flow viscosity of 25 or 30 seconds are placed in a bag in bag tube and applied using a battery operated mixer which applies about 220 psi (1517 kPa) pressure to the mixture in the tube. A mixer having a length of 7 inches is used. The impact energy of the adhesive and Shore D hardness are measured 20 minutes after cure. The flow rate in grams per minute of the mixed adhesive is measured. The press flow viscosity of the adhesive varies from 25 to 30 seconds. Cure rate is measured by impact energy and Shore A hardness. The results are compiled in Table 1.

TABLE 1

| Mixer configuration | Mixer Diameter mm | Press flow viscosity (s) | Impact Energy (mJ) | Flow Rate (g/min) | Shore D Hardness |
|---|---|---|---|---|---|
| 5 element helical 5 element X-Grid | 20 | 25 | 6693 | 1000 | 23 |
| 10 Element Helical | 20 | 25 | 2366 | 84.0 | |
| 12 Element Helical | 16 | 25 | AF | 420 | |
| Hand Mixed | | 25 | 8578 | | 28 |
| X Grid Only | 20 | 25 | <1000 | NM | |
| 5 element helical 5 element X-Grid | 20 | 30 | 6645 | 1000 | 23 |
| 10 Element Helical | 20 | 30 | 2000 | 800 | |
| X Grid Only | 20 | 30 | <1000 | >1000 | |
| 4 element helical 5 element X-Grid | 20 | 30 | | | 13 |
| 3 element helical 5 element X-Grid | 20 | 30 | | | 11 |
| 3 element helical 6 element X-Grid | 20 | 30 | | | 12 |
| 4 element helical 6 element X-Grid | 20 | 30 | | | 18 |
| 4 element helical 4 element X-Grid | 20 | 30 | | | 11 |
| 4 element helical 3 element X-Grid | 20 | 30 | | CD | |

AF means applicator failure. NM means not measured. CD means cannot dispense. These results illustrate that the best mixer design is 5 helical and 5 X grid elements, as indicated by the high values for impact energy and Shore A hardness, which are closest to the values for the hand mixed example.

Impact Energy is measured using the Izod impact test. Press Flow Viscosity: The press flow viscosity is determined as the time (seconds) required to extrude 20 grams of adhesive through a capillary. The width of the capillary is fixed at 0.104 in. (2.6 mm) and the applied pres-sure is 60 psi ($4.1 \times 10^5$ Pa). Unless otherwise noted, all press flow viscosity values were determined at 23+/−1° C.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended in cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An article comprising: two parts wherein each part has two or more sections connected together wherein each section is formed from one or more a molded materials wherein the molded materials form the periphery of a hollow structure having a proximal end, a distal end, a cross section and open passages in the molded material on the periphery of the hollow structure, a central axis through the hollow structure transverse to the cross section of the molded material and the passages in the molded material having a central axis through the passages; wherein adjacent sections are connected near the proximal end of each section and the angle formed by the central axis of adjacent connected sections is from about 45 to about 90 degrees and the angle formed by the central axis of the hollow structure of each section and the central axis of the passages in the molded material is from about 45 to about 90 degrees; wherein each part is a mirror image of the other and the two parts can be assembled to form a symmetrical structure and one part has connected to one end a molded structure comprising one or more helical shaped elements.

2. An article according to claim 1 wherein the molded material of each section forms a consistent cross-section formed along planes perpendicular to the central axis of the hollow structure.

3. An article according to claim 1 wherein the cross-section formed by the molded material is oval, circular or polygonal.

4. An article according to claim 1 wherein the molded material comprises metal, thermoplastic resins or thermoset resins.

5. An article according to claim 1 wherein the molded material comprises one or more thermoplastic resins or thermoset resins which further comprises one or more fillers, reinforcing fibers or mixtures thereof.

6. An article according to claim 1 wherein adjacent elements are connected together near the proximal end at a location from the proximal end that is equal to half the linear distance of the central axis of two sequential elements of the same orientation while in the assembled state.

7. An article according to claim 1 wherein one or both parts have connected to at least one end a molded structure of another shape.

8. An article according to claim 1 wherein the two parts are assembled.

9. An article according to claim 1 comprising three or more elements wherein the cross-section of the structure formed by the molded material is a square for each element, the elements are connected at opposing corners of the structure and one of the sections further comprises a molded section comprising more than one helical structure.

10. An article according to claim 1 wherein each helical element forms a path that rotates about 180 degrees and the starting point of the path of the helical path of adjacent elements is about 90 degrees from the ending point of the adjacent element.

11. A method comprising
a) introducing two parts of curable material having a high viscosity into an elongated mixing chamber having a mixer comprising an article according to claim 1, an inlet and an outlet, wherein the helical portion is disposed at the inlet end of the chamber so that the two parts of the curable material passes through the helical section first;
b) applying sufficient pressure on the material entering the inlet of the chamber to move the material through the chamber in contact with the mixer under conditions that the two parts are mixed sufficiently to cure and perform the desired function of the curable material; and
c) applying the mixed two parts of the curable material to one or more substrates.

12. A method according to claim 11 which further comprises
d) contacting a first substrate with a second substrate with the mixed two part curable material disposed between the two substrates; and
e) allowing the mixed two part curable material to cure and bond the two substrates together.

13. A method according to claim 11 wherein the mixer comprises one or more helical elements and two or more hollow elements wherein the helical portion is disposed at the inlet end of the mixing chamber so that the two parts of the curable material passes through the helical section first.

14. A method according to claim 11 wherein the mixer has from about 3 to about 5 helical elements and from about 3 to about 6 hollow elements.

15. A method according to claim 11 wherein the viscosity of the two part of the curable material is from about 30,000 to about 5,000,000 Pa·s.

16. A method according to claim 11 wherein the pressure applied to the two parts of the curable material is from about 150 to about 500 psi.

17. A method according to claim 11 wherein the two part curable material is contacted at a volumetric ratio of 1:1 to 100:1.

18. A method according to claim 11 wherein the two parts of the curable materials are introduced from a single tube having the lowest volume part enclosed in a bag within the highest volume part.

* * * * *